(12) United States Patent
Hoefel et al.

(10) Patent No.: US 12,297,823 B2
(45) Date of Patent: *May 13, 2025

(54) ELECTRICAL SUBMERSIBLE PUMP CONTROL

(71) Applicant: Sensia LLC, Houston, TX (US)

(72) Inventors: Albert Hoefel, Sugar Land, TX (US); Gocha Chochua, Katy, TX (US); Yves-Marie Clet Robert Subervie, Houston, TX (US); Jonathan Wun Shiung Chong, Calgary (CA)

(73) Assignee: Sensia LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,005

(22) Filed: Jan. 19, 2024

(65) Prior Publication Data

US 2024/0159232 A1    May 16, 2024

Related U.S. Application Data

(63) Continuation of application No. 17/292,376, filed as application No. PCT/US2019/060224 on Nov. 7, 2019, now Pat. No. 11,913,444.

(Continued)

(51) Int. Cl.
*F04B 47/00*    (2006.01)
*E21B 43/12*    (2006.01)
(Continued)

(52) U.S. Cl.
CPC ........... *F04B 47/00* (2013.01); *E21B 43/128* (2013.01); *E21B 47/008* (2020.05);
(Continued)

(58) Field of Classification Search
CPC ........ F04B 17/03; F04B 47/00; F04B 49/065; F04B 49/20; F04B 2203/0201;
(Continued)

(56) References Cited

U.S. PATENT DOCUMENTS 10,145,224 B1    12/2018    Shenoy et al.
11,913,444 B2 *    2/2024    Hoefel ................... H02K 5/132
(Continued)

FOREIGN PATENT DOCUMENTS

CN    101680793 A    3/2010
CN    105676633 A    6/2016
(Continued)

OTHER PUBLICATIONS

Chinese Office Action on CN Appl. Ser. No. 201980088146.7 dated Dec. 30, 2022 (22 pages).

(Continued)

*Primary Examiner* — Charles G Freay
(74) *Attorney, Agent, or Firm* — Foley & Lardner LLP (57) ABSTRACT

A system, method, and computer-readable medium for determining the flow rate and fluid density in an electrical submersible pump (ESP) and controlling the ESP based on the flow rate and density. In one implementation, an ESP system includes an ESP, drive circuitry, a current sensor, a voltage sensor, and a processor. The ESP includes an electric motor. The drive circuitry is electrically coupled to the ESP and is configured to provide an electrical signal to power the ESP. The current sensor is configured to measure a current of the electrical signal. The voltage sensor is configured to measure a voltage of the electrical signal. The processor is configured to calculate speed of a shaft of the electric motor based on a frequency induced by rotation of the motor detected in the current. The processor is also configured to calculate a density of fluid in the ESP based on the speed.

20 Claims, 7 Drawing Sheets

Related U.S. Application Data (60) Provisional application No. 62/757,523, filed on Nov. 8, 2018.

(51) Int. Cl.

| | | |
|---|---|---|
| *E21B 47/008* | (2012.01) | |
| *F04B 49/06* | (2006.01) | |
| *F04B 49/20* | (2006.01) | |
| *F04D 13/10* | (2006.01) | |
| *F04D 15/00* | (2006.01) | |
| *H02K 5/132* | (2006.01) | |
| *H02K 11/21* | (2016.01) | |
| *H02P 23/14* | (2006.01) | |
| *H02P 29/64* | (2016.01) | |
| *F04B 17/03* | (2006.01) | |

(52) U.S. Cl.
CPC ............ *F04B 49/065* (2013.01); *F04B 49/20* (2013.01); *F04D 13/10* (2013.01); *F04D 15/0066* (2013.01); *H02K 5/132* (2013.01); *H02K 11/21* (2016.01); *H02P 23/14* (2013.01); *H02P 29/64* (2016.02); *F04B 17/03* (2013.01); *F04B 2203/0201* (2013.01); *F04B 2203/0202* (2013.01); *F04B 2203/0204* (2013.01); *F04B 2203/0205* (2013.01); *F04B 2203/0207* (2013.01); *F04B 2203/0209* (2013.01); *F04B 2205/00* (2013.01); *H02P 2203/09* (2013.01)

(58) Field of Classification Search
CPC ...... F04B 2203/0202; F04B 2203/0204; F04B 2203/0205; F04B 2203/0207; F04B 2205/00; E21B 43/128; E21B 47/008; F04D 13/10; F04D 15/0066; H02K 5/132; H02K 11/21; H02P 23/14; H02P 29/64; H02P 2203/09
See application file for complete search history.

(56) References Cited

U.S. PATENT DOCUMENTS

| | | | |
|---|---|---|---|
| 2004/0064292 A1 | 4/2004 | Beck et al. | |
| 2008/0067116 A1* | 3/2008 | Anderson | ................ G01F 1/80 702/45 |
| 2012/0270325 A1 | 10/2012 | Sperry et al. | |
| 2017/0022796 A1 | 1/2017 | Joshi et al. | |
| 2017/0022797 A1 | 1/2017 | Joshi et al. | |
| 2019/0085682 A1* | 3/2019 | Etter | ..................... G01R 27/16 |

FOREIGN PATENT DOCUMENTS

| | | |
|---|---|---|
| CN | 105765476 A | 7/2016 |
| CN | 106468167 A | 3/2017 |
| EP | 2 162 981 B1 | 3/2010 |
| WO | WO-2020/097301 A1 | 5/2020 |

OTHER PUBLICATIONS

Chinese Office Action with Search Report for CN Appl. Ser. No. 201980088146.7 dated Aug. 30, 2023 (26 pages).
EPO Search Report on EP Appl. Ser. No. 19881556.5 dated Jul. 5, 2022 (9 pages).
EPO Examination Report for EPO Appl. Ser. No. 19881556.5 dated Oct. 11, 2023 (6 pages).
International Preliminary Report on Patentability in PCT Appl. Ser. No. PCT/US2019/060224 dated May 20, 2021 (6 pages).
International Search Report and Written Opinion on PCT Appl. Ser. No. PCT/US2019/060224 dated Feb. 28, 2020 (9 pages).
Kim, Electric Motor Control ([edition unavailable]). "Chapter 3—Alternating current motors: Synchronous motor and induction motor," Copyright 2017 Elsevier Inc (pp. 95-152).
Kim, Electric motor control: DC, AC, and BLDC motors. Chapter 3 "Alternating current motors: synchronous motor and induction motor" Elsevier, 2017, (pp. 95-152).
Lea et al., "Gas well deliquification," Gulf Professional Publishing, Chapter 12 Electrical submersible pumps, 2019, (pp. 237-308).
Morrison et al. "Pump affinity laws modified to include viscosity and gas effects" 46th Turbomachinery and 33rd Pump Symposia, Houston, TX. 2017 (16 pages).
SA Office Action on SA Appl. Ser. No. 521422011 dated Dec. 14, 2022 (7 pages).
Vodovozov et al. "Control of liquid density to prevent abnormal pumping performance" 7th WSEAS International Conference on Waste Management, Water Pollution, Air Pollution, Indoor Climate WWAI, 2013 (pp. 217-222).
Zhu et al. "CFD simulation and experimental study of oil viscosity effect on multi-stage electrical submersible pump (ESP) performance." Journal of Petroleum Science and Engineering, vol. 146, 2016 (pp. 735-745).

\* cited by examiner

ELECTRICAL SUBMERSIBLE PUMP CONTROL

CROSS-REFERENCE TO RELATED PATENT APPLICATIONS

This continuation application is a continuation of U.S. application Ser. No. 17/292,376, filed May 7, 2021, which is a 371 US National Phase application of PCT Patent Application No. PCT/US2019/060224, filed Nov. 7, 2019, and which claims the benefit of and priority to U.S. Provisional Application No. 62/757,523, entitled "ELECTRICAL SUBMERSIBLE PUMP CONTROL," filed Nov. 8, 2018, the disclosures of which are hereby incorporated by reference in their entirety.

BACKGROUND

Electrical submersible pumps (ESPs) may be deployed for any of a variety of pumping purposes. For example, where a fluid does not readily flow responsive to existing natural forces, an ESP may be deployed to artificially lift the fluid. In one common application, a completion system is installed in a well to produce hydrocarbons from a reservoir intersected by the well. The completion system includes an ESP to provide artificial lift to the hydrocarbons extracted from the reservoir.

SUMMARY

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment. The exemplary embodiments presented herein, or any elements thereof, may be combined in a variety of ways, i.e., any element from one exemplary embodiment may be used in any other exemplary embodiment, without departing from the scope of the disclosure.

A system, method, and computer-readable medium for determining the flow rate and fluid density in an electrical submersible pump (ESP) and controlling the ESP based on the flow rate and density are disclosed herein. In one implementation, an ESP system includes an ESP, drive circuitry, a current sensor, a voltage sensor, and a processor. The ESP includes an electric motor. The drive circuitry is electrically coupled to the ESP and is configured to provide an electrical signal to power the ESP. The current sensor is configured to measure a current of the electrical signal. The voltage sensor is configured to measure a voltage of the electrical signal. The processor is configured to calculate speed of a shaft of the electric motor based on a frequency, induced by rotation of the motor, detected in the current. The processor is also configured to calculate a density of fluid in the ESP based on the speed. The processor may also be configured to determine a flow rate of the fluid in the ESP based on the speed. The processor may also be configured to determine a value of head based on the speed, and to determine the density based on the value of head. The processor may also be configured to determine a torque in the ESP based on a measured current of the electrical signal, a measured voltage of the electrical signal, a resistance of a conductor that electrically couples the ESP to the drive circuitry, and a resistance of a stator of the ESP. The processor may also be configured to determine the resistance of the conductor as a function of a temperature of the conductor, and determine the resistance of the stator as a function of a temperature of the electric motor.

The ESP system may also include an intake pressure sensor and a discharge pressure sensor. The intake pressure sensor is coupled to the ESP and configured to measure a pressure of the fluid at an intake of the ESP. The discharge pressure sensor is coupled to the ESP and configured to measure a pressure of the fluid at an outlet of the ESP. The processor may also be configured to determine a ratio of pressure-to-torque in the ESP based on the measured a pressure of the fluid at the intake of the ESP, and the measured a pressure of the fluid at the outlet of the ESP. The processor may also be configured to calculate a flow-to-speed ratio based on an efficiency curve for the ESP and the ratio of pressure-to-torque. The processor may also be configured to calculate a value of flow based on the flow-to-speed ratio. The processor may also be configured to reduce the speed of the electric motor responsive to the density being lower than a predetermined threshold value.

In another implementation, a method for controlling an ESP includes generating an electrical drive signal to power the ESP. A current of the electrical drive signal is measured. A voltage of the electrical drive signal is measured. A speed of a shaft of an electric motor of the ESP is calculated based on a frequency, induced by rotation of the motor, detected in the current. A density of fluid in the ESP is calculated based on the speed. The method may also include determining a flow rate of the fluid in the ESP based on the speed. The method may also include determining a value of head based on the speed, and determining the density based on the value of head. The method may also include determining a torque in the ESP based on the measured current, the measured voltage, a resistance of a conductor that electrically couples the ESP to circuitry that generates the electrical drive signal, and a resistance of a stator of the ESP. The method may also include determining the resistance of the conductor as a function of a temperature of the conductor, and determining the resistance of the stator as a function of a temperature of the electric motor. The method may also include measuring a first pressure of the fluid at an intake of the ESP, measuring a second pressure of the fluid at an outlet of the ESP, and determining a ratio of pressure-to-torque in the ESP based on the first pressure, the second pressure and the torque. The method may also include comprising calculating a flow-to-speed ratio based on an efficiency curve for the ESP and the ratio of pressure-to-torque. The method may also include calculating a value of flow based on the flow-to-speed ratio. The method may also include reducing the speed of the electric motor responsive to the density being lower than a predetermined threshold value.

In a further implementation, a non-transitory computer-readable medium is encoded with instructions that are executable by a processor to cause the processor to receive a measurement of a current of an electrical drive signal powering an ESP, and receive a measurement of a voltage of the electrical drive signal. The instructions also cause the processor to calculate a speed of a shaft of an electric motor of the ESP based on a frequency detected in the current. The frequency is induced in the current by rotation of the motor. The instructions further cause the processor to calculate, based on the speed, a density of a fluid in the ESP and a flow rate of the fluid in the ESP. The instructions may also cause the processor to receive a measurement of a current of an electrical drive signal powering an electrical submersible pump (ESP), receive a measurement of a voltage of the electrical drive signal, calculate speed of a shaft of an electric motor of the ESP based on a frequency detected in the current, and calculate, based on the speed, a density of a fluid in the ESP and a flow rate of the fluid in the ESP. The frequency is induced in the current by rotation of the electric motor. The instructions may also cause the processor to calculate a resistance of a conductor that electrically couples the ESP to circuitry that generates the electrical drive signal as a function of a temperature of the conductor, calculate a resistance of a stator of the ESP as a function of a temperature of the electric motor, and calculate a torque in the ESP based on: the measurement of the current, the measurement of the voltage, the resistance of the conductor, and the resistance of the stator. The instructions may also cause the processor to receive a measurement of a pressure of the fluid at an intake of the ESP, receive a measurement of a pressure of the fluid at an outlet of the ESP, and calculate a ratio of the pressure across the ESP to the torque. The instructions may also cause the processor to calculate a flow-to-speed ratio based on an efficiency curve for the ESP and the ratio of the pressure across the ESP to the torque. The instructions may also cause the processor to calculate the flow rate based on the flow-to-speed ratio.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

When producing a reservoir using an electrical submersible pump (ESP) to provide artificial lift, the ESP is typically run as fast as possible to maximize production. However, pump speed should not be high enough to elevate the gas content of the produced fluid by pulling down the intake pressure of the ESP. Moreover, high inhomogeneous gas content increases the risk of gas lock, a condition where the ESP is locally not primed. The ESP system may include sensors for monitoring pump operational parameters and ensuring optimal production. Pump intake pressure and the flow rate of fluid in the ESP are important parameters for understanding how the reservoir responds to production. An ESP may include intake and outlet pressure sensors for monitoring pressure across the pump, but lack a flow sensor. Some production systems may include flow metering at surface. However, measurement of flow at the surface may provide different results from measurement downhole because of differences in the pressure and temperature in the well relative to the surface and storage inside the well.

If gas content and viscosity of the fluid in the ESP is not too high, a flow rate can be estimated based on nominal pump behavior and the measured pressure at the intake and outlet sensors of the ESP. Implementations of the present disclosure estimate the flow rate of fluid in the ESP, and estimate the density of the fluid based on the estimated flow. Implementations of the ESP control system and control method disclosed can apply the flow rate and/or density estimates to manage operation of the ESP.

Estimation of flow and density begin with measurements of pressure across the ESP, an ESP efficiency curve, and a head curve. Given the pressure measurements and a value of torque, the point of operation on the efficiency curve may be determined. With a measurement of the shaft speed of the ESP's motor, implementations determine the flow rate, determine head based on the flow and speed measurements, and determine density based on pressure and head measurements.

Torque and speed are typically not measured in an ESP system. Some methods for estimating ESP speed and torque rely on nominal motor operation curves. Implementations of the present disclosure apply speed and torque estimates based on dynamically acquired voltage and currents measured at the ESP drive equipment on the surface. Non-linearities in the ESP motor create high frequency tones in the phase current spectrum that the system and method disclosed herein apply to provide a precision estimate of motor speed.

The system and method disclosed herein apply known motor stator and cable resistance to determine the electrical actuation torque of the ESP. Based on a motor temperature measurement and the precision speed estimate the internal motor viscous losses are estimated in form of an internal load torque. The torque estimate can be refined based on the temperature of the conductors that connect the ESP to the surface equipment, and with known drive frequency, rotor speed, and drive voltage and currents the motor output torque can be further adjusted for the internal motor core losses.

Figure 1:
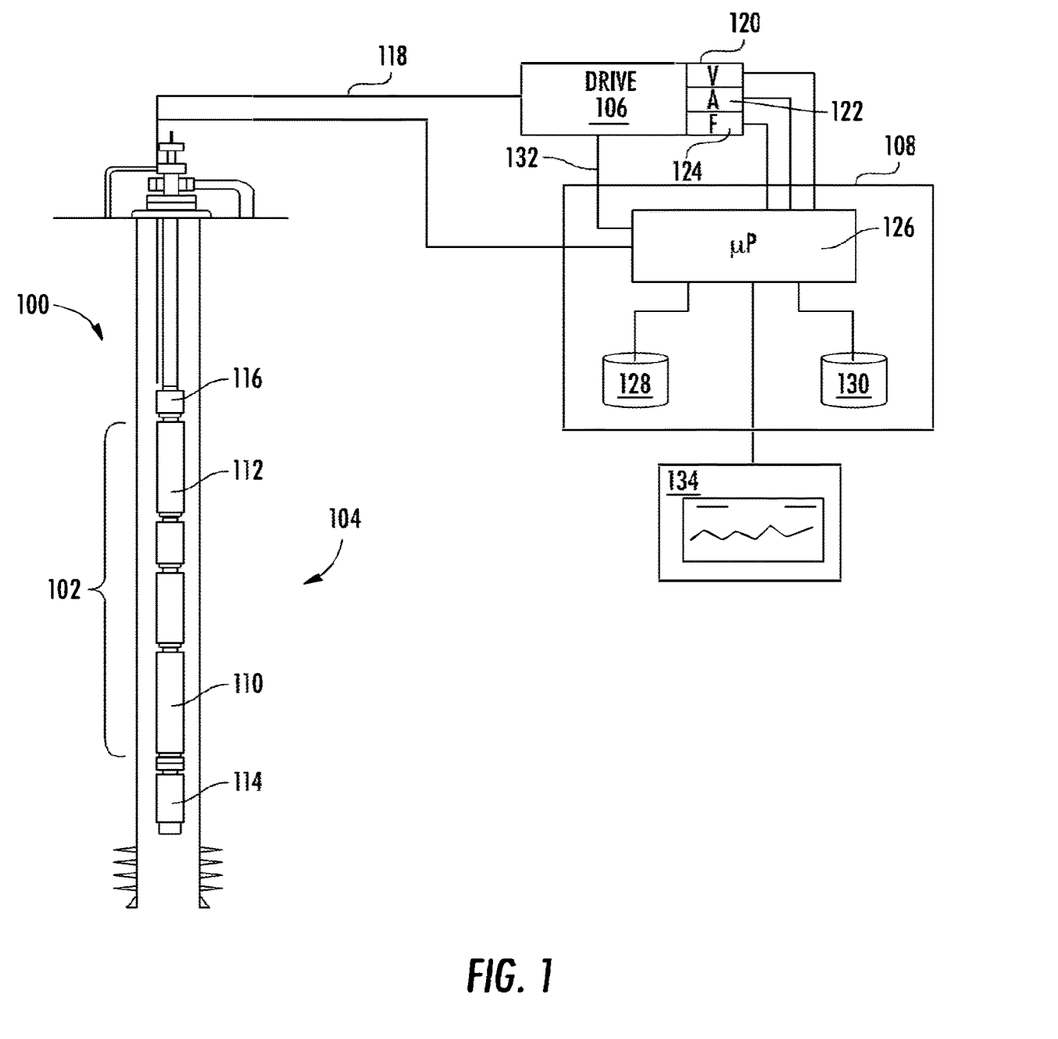
FIG. 1 shows a schematic diagram for a well completion system that includes an electrical submersible pump in accordance with the present disclosure.

FIG. 1 shows a schematic diagram for an example well completion system 100 that includes an ESP in accordance with the present disclosure. The well completion system 100 includes an ESP 102 disposed in a wellbore 104, and drive circuitry 106 and processing circuitry 108 disposed at the surface. Implementations of the well completion system 100 may include various other downhole tools such as packers, by-pass tubing, ESP encapsulation, or other tools. The presently disclosed systems and methods are independent of the completion architecture used in the specific application outside of the use of an ESP. The well associated with the well completion system 100 may produce any of a variety of fluids, such as liquid hydrocarbons or water. In the case of an oil well, the ESP 102 may be deployed to improve production of hydrocarbons.

The ESP 102 includes a motor 110 and a pump 112. The motor 110 operates to drive the pump 112 in order to increase movement of fluid to the surface. The ESP 102 further includes an intake pressure sensor 114, this may be an integral part of the ESP 102 or be a separate device. The intake pressure sensor 114 may be a part of a multisensory unit that includes a variety of sensors. The intake pressure sensor 114 measures the pressure upstream of the ESP 102. The ESP 102 further includes a discharge pressure sensor 116, which may be an integral part of the ESP 102, or may be a separate device. The discharge pressure sensor 116 measures the pressure downstream of the ESP 102. In some implementations of the well completion system 100, temperature sensors (not shown) are included in the ESP 102 or as part of a multisensory unit. The temperature sensors measure the temperature of the fluid at an intake of the ESP and also measure the temperature of the motor 110.

The motor 110 of the ESP 102 receives electrical drive signals from the drive circuitry 106, which is typically located at the surface. The drive circuitry 106 controls the power to the motor 110, which is provided by a generator or utility connection (not shown). In the implementation of the well completion system 100 shown in FIG. 1, the drive circuitry 106 is a variable speed driver. The drive circuitry 106 provides drive signals to the ESP 102 through an electrical conductor 118. The drive circuitry 106 is either connected to or includes a variety of sensors for monitoring the electrical signal provided to the ESP 102. In some implementations, the drive circuitry 106 includes a voltage sensor 120, a current sensor 122, and a frequency sensor 124. The voltage sensor 120 acquires samples of the voltage of the drive signals provided via the electrical conductor 118, and digitizes the voltage samples. Similarly, the current sensor 122 acquires samples representative of the current of the drive signals provided via the electrical conductor 118, and digitizes the current samples. The frequency sensor 124 measures the frequency of the drive signals provided to the ESP 102. The sample rate implemented by the voltage sensor 120, the current sensor 122, and/or the frequency sensor 124 may vary based on the frequencies of the signals to be digitized. In some implementations of the well completion system 100, the voltage sensor 120, the current sensor 122, and/or the frequency sensor 124 may be separate from the drive circuitry 106. In some implementations of the well completion system 100, the drive signals provided to the ESP 102 are multi-phase (e.g., three-phase), and the voltage sensor 120 and the current sensor 122 measure the voltage and current of each phase. The drive circuitry 106, or other circuitry associated with the voltage sensor 120 and the current sensor 122 may include sampling circuitry, and one or more analog-to-digital converter with sufficient resolution and digitization speed to capture a highest frequency of interest in the voltage and current signals being digitized.

The drive circuitry 106 provides measurements of voltage, current, and/or frequency of the drive signal to the processing circuitry 108 for further processing. The processing circuitry 108 is also communicatively connected to the intake pressure sensor 114 and to the discharge pressure sensor 116. The processing circuitry 108 receives measurements of intake pressure from the intake pressure sensor 114 and receives measurements of discharge pressure from discharge pressure sensor 116. While in some embodiments, the processing circuitry 108 may receive measurements (intake pressure, discharge pressure, voltage, current, and/or frequency) in real-time or near real-time, in some implementations, the processing circuitry 108 may receive at least some measurements after a time delay.

The processing circuitry 108 includes a processor 126 that is communicatively connected to a computer-readable medium 128 programmed with instructions that upon execution by the processor 126 causes the processor 126 to perform the functions disclosed herein. The processor 126 may be a general-purpose microprocessor, a digital signal processor, a microcontroller, or other circuitry that can execute instructions to perform the functions disclosed herein. The computer-readable medium 128 may be a memory such as a volatile or non-volatile memory, magnetic storage, optical storage, etc.

The processing circuitry 108 further comprises a computer readable medium that operates as a database 130. The processor 126 stores the data received and calculated by the processor 126 in the database 130. The processor 126 can control a graphical display 134 (e.g., a visual display device), for example, to present a graph of the log of calculated values and, for example, a graph that presents a qualitative analysis of a flow rate and/or density of fluid in the ESP 102. In various implementations of the processing circuitry 108, the processor 126 is located at the well site or a remote location. For example, in some implementations, the processor 126 is not integrated with the processing circuitry 108, but is rather connected locally by a wired or wireless data connection. In such implementations, the processor 126 may be a computer that establishes a data connection with the processing circuitry 108. The computer may include the computer-readable medium 128 and database 130. In an alternative implementation, the processing circuitry 108 transmits the measured values to a remote computer or server through a wired, wireless, or satellite data connection. In these implementations, the processor 126 and computer-readable medium 128 and database 130 are located remotely from the processing circuitry 108.

The processing circuitry 108 also provides control signals 132 to the drive circuitry 106. The control signals 132 may cause the drive circuitry 106 to change the voltage, current, and/or frequency of the drive signals provided to the ESP 102 by the drive circuitry 106. The processing circuitry 108 may compute the flow rate and density of the fluid in the ESP 102 based on the voltage measurements, current measurements, pressure measurements, temperature measurements, etc., and cause the drive circuitry 106 to change the drive signals responsive to the values of flow rate and/or density. For example, if the value of fluid density calculated by the processing circuitry 108 indicates that the gas content of the fluid is excessive (i.e., the density is below a predetermined threshold), then the processing circuitry 108 may cause the drive circuitry 106 to reduce the speed of the motor 110 to increase the intake pressure of the ESP 102 and decrease the gas content of the fluid in the ESP 102.

Figure 2:
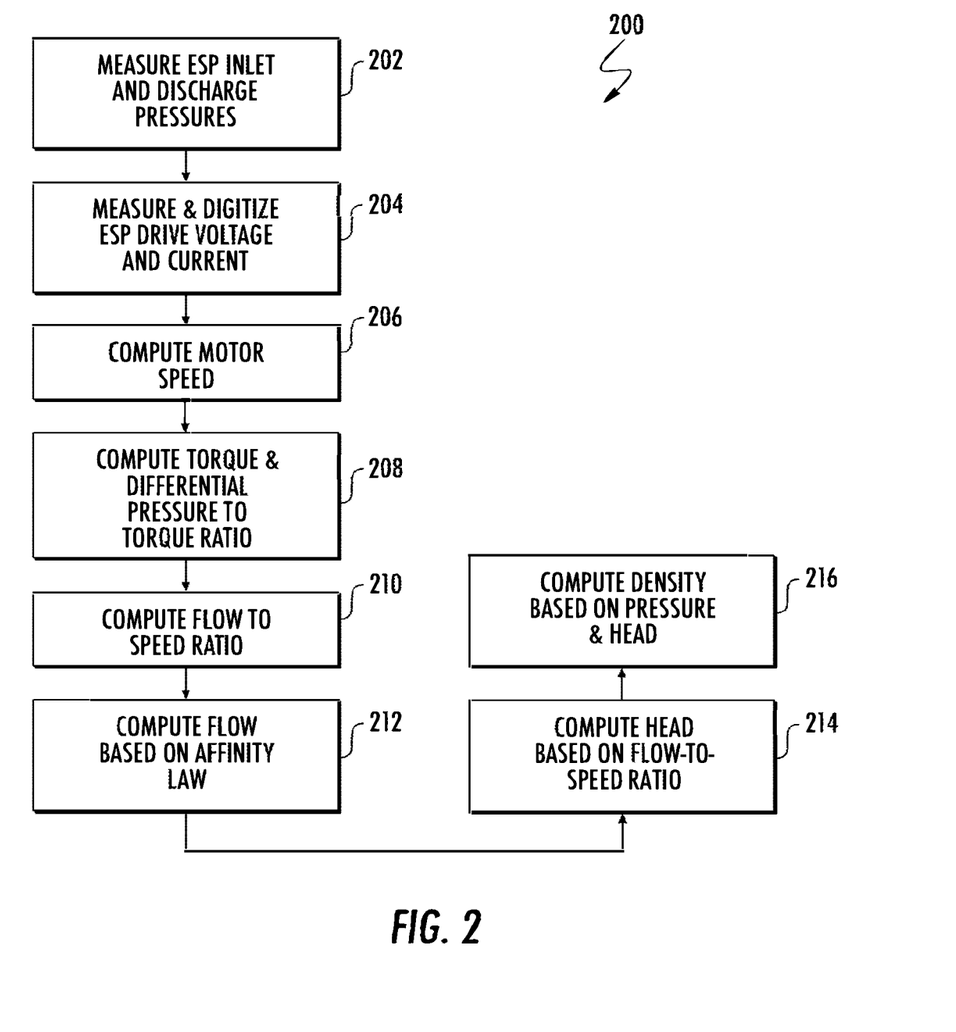
FIG. 2 shows a flow diagram for a method for determining flow rate and density of fluid in an ESP in accordance with the present disclosure.

FIG. 2 shows a flow diagram for a method 200 for determining flow rate and density of fluid in the ESP 102 in accordance with the present disclosure. Though depicted sequentially as a matter of convenience, at least some of the actions shown can be performed in a different order and/or performed in parallel. Additionally, some implementations may perform only some of the actions shown. At least some operations of the method 200 may be performed by the well completion system 100. Instructions stored in the computer-readable medium 128 may be executed by the processor 126 to perform operations of the method 200.

In the method 200, the determination of flow and density is based on the affinity law. At high Reynolds numbers (>10e+6) and with a homogeneous fluid it can be assumed that the efficiency of the ESP 102 is constant for a given flow-to-speed ratio, i.e., the changes in flow rate and shaft speed are linear dependent. Pump efficiency is calculated from the ratio of hydraulic output power given by pressure times flow to mechanical input power given by torque times speed. The pump efficiency is typically specified at a nominal speed. Pump efficiency may be expressed as a function of flow-to-speed ratio:

$$\eta_{Pump} = \frac{(P_d - P_i)Q}{\tau \omega} = f\left(\frac{(Q)}{\omega}\right)$$

where:
$P_d$ is discharge pressure;
$P_i$ is intake pressure;
Q is flow rate;
$\tau$ is torque; and
$\omega$ is shaft or rotor speed of the motor 110.

Head is defined as the equivalent height corresponding to hydrostatic pressure. The affinity law states that the head is a function of flow and proportional to the square of the shaft speed, i.e., for known flow and shaft speed head is clearly defined. Head may be expressed as:

$$H = \frac{(P_d - P_i)}{\rho g} = h(Q, \omega)$$

where:
g is the gravity constant.

Typically head dependency on flow is specified as a function of flow at a given nominal reference speed h(Q, $\omega$=const). With known flow and speed the head curve is used to calculate head.

$$H(Q, \omega) = h(Q, \omega_n)\frac{\omega^2}{\omega_n^2}$$

The head and efficiency curves are based on the pump design. With multiple stacked pump stages the nominal efficiency curve stays the same, but head rises proportional to the number of stages. With manufacturing variability, the real pump curves differ from the design curve. With cumulative operation time, pump efficiency and head may be reduced depending on the operating environment.

Using pressure measurements received from the intake pressure sensor 114 and the discharge pressure sensor 116, and computed speed and torque, implementations of the well completion system 100 use the pump efficiency and head curves to determine flow and density.

The manufacturing test results for a pump can be used to characterize the pump in its initial state by the pump curves. Any additional operation under steady state controlled conditions, that include flow measurements, can be used to recalibrate the pump curves. Typically, the efficiency and head curves at nominal speed are represented as polynomials from a curve fit of the design or manufacturing results. For simpler processing, an additional polynomial k(y) is derived from the efficiency curve that allows the well completion system 100 to directly calculate flow from torque and pressure.

In block 202, the intake pressure sensor 114 measures the pressure of the fluid at the intake of the ESP 102, and transmits the pressure measurement to the processing circuitry 108. Similarly, the discharge pressure sensor 116 measures the pressure of the fluid at the outlet of the ESP 102 and transmits the pressure measurement to the processing circuitry 108. In some implementations of the 200, temperature sensors in the ESP 102 measure the temperature of the fluid, the motor 110, and/or other downhole components, and transmit the measured temperature values to the processing circuitry 108.

In block 204, the voltage sensor 120 samples the voltage of the drive signals provided to the ESP 102 by the drive circuitry 106, digitizes the sampled voltage, and transfers the digitized voltage value to the processing circuitry 108. Similarly, the current sensor 122 samples the current of the drive signals provided to the ESP 102 by the drive circuitry 106, digitizes the sampled current, and transfers the digitized current value to the processing circuitry 108. The rate of sampling and digitization of the voltage and current are sufficient to capture a highest frequency of interest in the voltage and/or current. A temperature sensor at the surface may also measure the temperature at the wellhead and provide the measured temperature to the processing circuitry 108.

Figure 3:
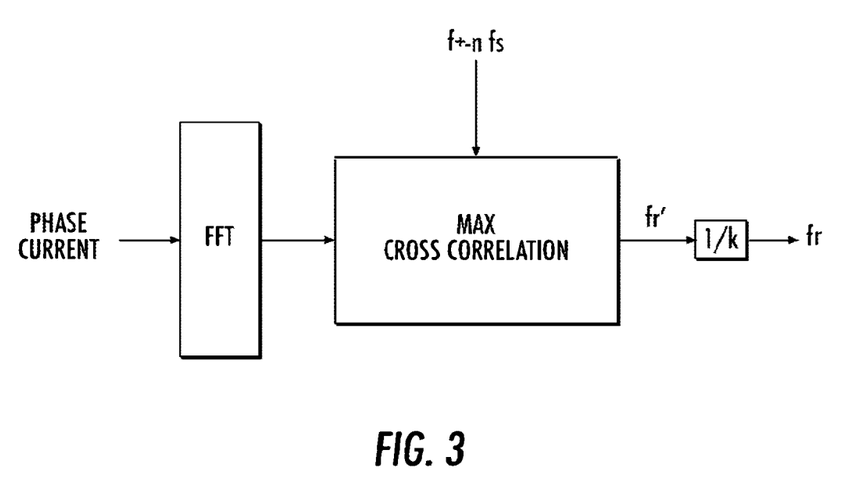
FIG. 3 shows an example processing flow diagram for determining shaft speed of a motor of an ESP in accordance with the present disclosure.

In block 206, the processing circuitry 108 computes motor speed. FIG. 3 shows an example processing flow for computing shaft speed of the motor 110. The various parameters shown in FIG. 3 are as follows:
Fs: drive frequency;
n: 1, 3, 5 . . . (harmonics of the drive frequency);
fr: shaft frequency;
f: frequency range; and
k: number of rotor bars of the motor 110.

A fast Fourier transform, or other frequency domain transform, is applied to the current measurements received from the drive circuitry 106. Cross-correlation is applied to search for a best match to predetermined harmonics of the drive frequency in the frequency domain current measurements. The best match corresponds to the rotor bar frequency, and division by the number of rotor bars in the motor 110 produces the shaft frequency of the motor 110.

Figure 4:
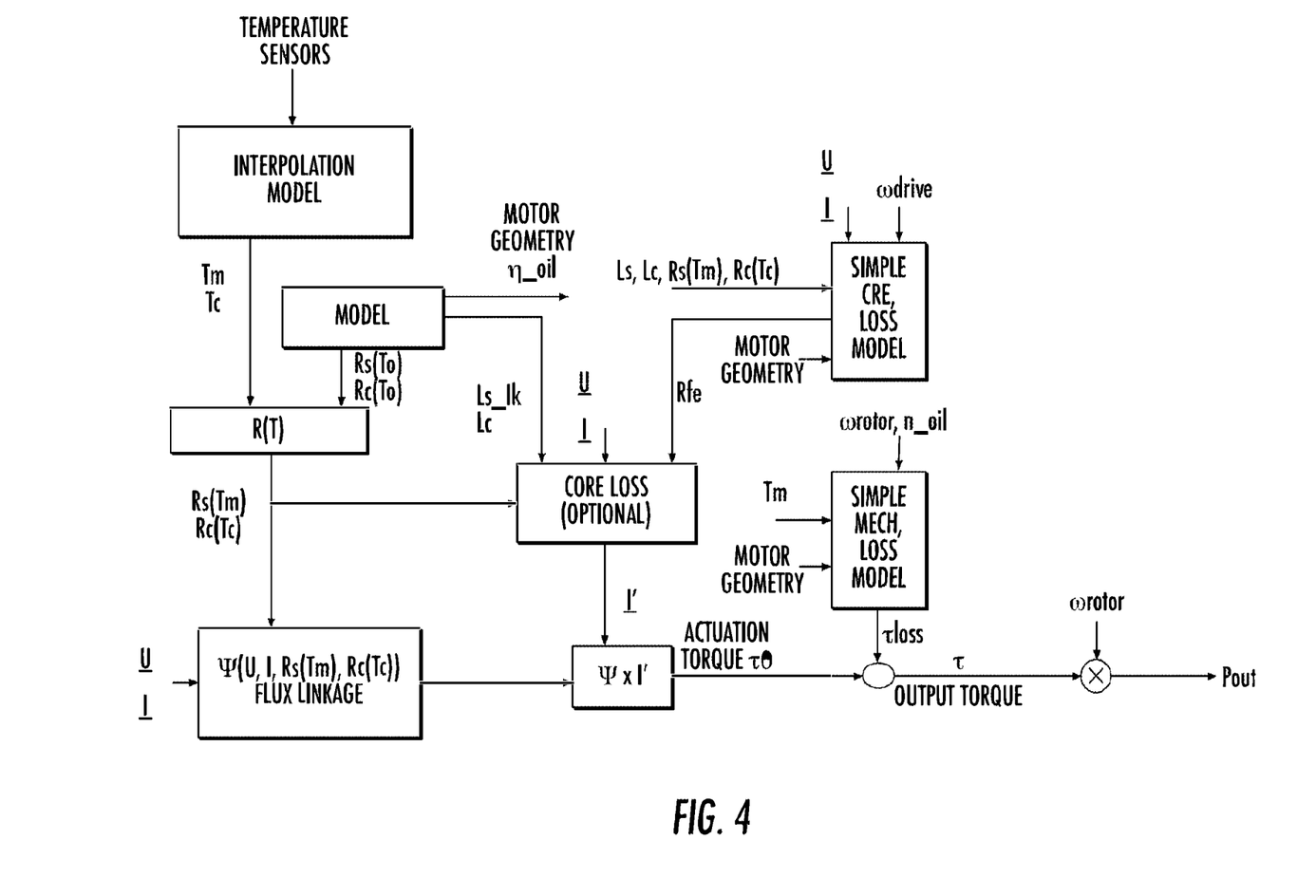
FIG. 4 show an example processing flow diagram for determining torque in an ESP in accordance with the present disclosure.

Returning now to FIG. 2, in block 208, the processing circuitry 108 computes the torque applied in the ESP 102. FIG. 4 shows an example processing flow for computing torque in the well completion system 100. The various parameters shown in FIG. 4 are as follows:
Ls_lk: stator leakage inductance;
Lr_lk: rotor leakage inductance;
Rs: stator resistance;
Lm: magnetization inductance;
Rr: rotor resistance;
Rfe: iron loss;
Rc: conductor electrical conductor 118 resistance;
Lc: conductor electrical conductor 118 inductance;
Tc: temperature of the electrical conductor 118;
Tm: temperature of the motor 110;
U: phase voltage vector;
I: phase current vector;
$\omega$rotor: rotor speed; and
$\eta$_oil: oil viscosity.

Given temperature measurements, including temperature of the motor 110, downhole fluid temperature, and wellhead temperature, and a measurement of the current flowing in the electrical conductor 118, the processing circuitry 108 computes temperature values for the electrical conductor 118 and the motor 110 based on the temperature measurements and a model for heat transfer as a function of fluid. The processing circuitry 108 uses the computed temperatures of the electrical conductor 118 and the motor 110 to determine the resistance of the stator of the motor 110 and the resistance of the electrical conductor 118 based on a model of the resistance of the electrical conductor 118 and the motor 110 at room temperature. The processing circuitry 108 applies the resistances of the electrical conductor 118 and motor 110 with voltage and current measurements to compute a flux vector ($\psi$). Flux may be computed as an integral over time of measured voltage less drops across the electrical conductor 118 and the stator of the motor 110, or other methods. The processing circuitry 108 computes torque of the ESP 102 as the vector product of flux and measured current. In some implementations, the measured current is adjusted for core loss prior to the torque computation. The computed torque may be further adjusted for mechanical losses, such as friction and viscous drag, to produce an output torque value for the ESP 102.

The processing circuitry 108 computes a differential pressure to torque ratio based on the pressure values measured by the intake pressure sensor 114 and the discharge pressure sensor 116 of the ESP 102 and the computed output torque value. The differential pressure to torque ratio is expressed as:

$$y(t) = \frac{p(t)}{\tau(t)}$$

where:
p(t) is pressure across the ESP 102; and
$\tau$(t) is torque as derived above.

Returning to FIG. 2, in block 210, the processing circuitry 108 computes a flow-to-speed ratio based on the efficiency pressure values measured by the intake pressure sensor 114 and the discharge pressure sensor 116 of the ESP 102 and the computed output torque value. The flow/speed ratio is expressed as:

$$x(t)=k(y(t))$$

where:
y(t) is the pressure-to-torque ratio derived in block 208; and
k is a polynomial derived from the efficiency curve for the ESP 102.

In block 212, the processing circuitry 108 computes the flow rate in the ESP 102 based on the flow-to-speed ratio and the shaft speed determined in block 206. Applying the affinity law, the flow rate is expressed as:

$$Q(t)=\omega(t) \times (t)$$

Figure 5:
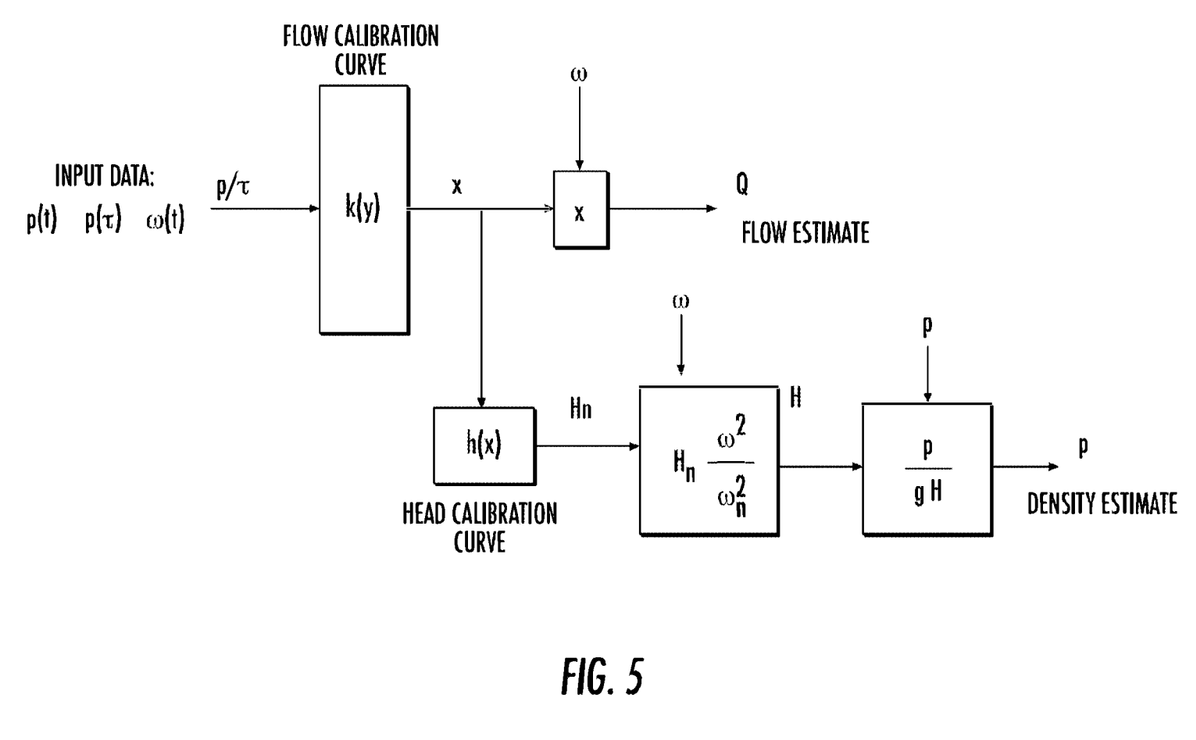
FIG. 5 shows an example processing flow diagram for determining flow rate and density of fluid in an ESP in accordance with the present disclosure.

FIG. 5 shows an example processing flow for computing flow rate and density in accordance with the present disclosure. In FIG. 5:

$$p = p_d - p_i;$$
$$x = \frac{Q}{\omega};$$
$$y = \frac{p}{\tau};$$

h(x) is the head curve at reference speed;

$$y = g(x) = \frac{\eta(x)}{x};$$

$\eta$(x) is the efficiency curve; and $$x=k(y)=g^{-1}(y).$$

Figure 6:
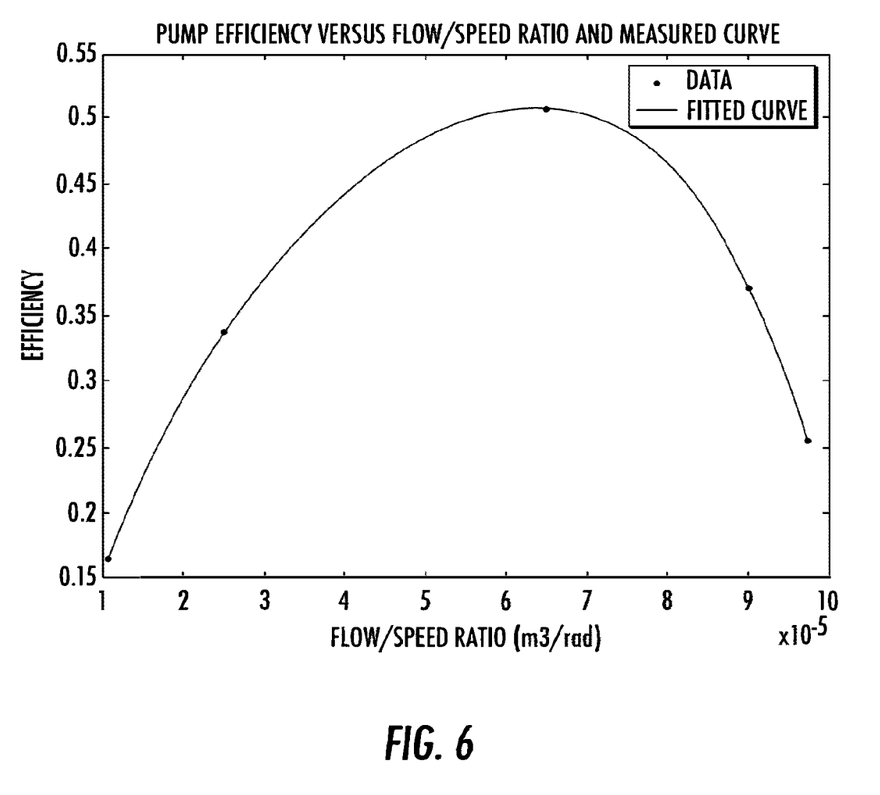
FIG. 6 shows an example graph of pump efficiency versus flow-to-speed ratio for an ESP in accordance with the present disclosure.
Figure 7:
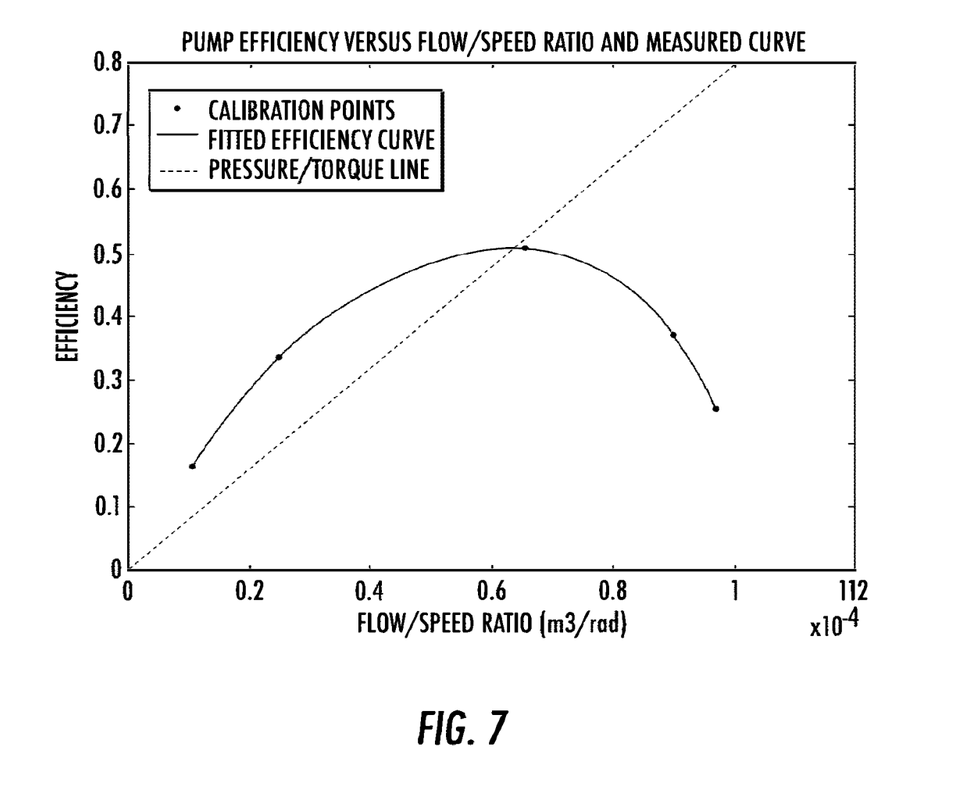
FIG. 7 shows the intersection of a pump efficiency curve with a pressure-to-torque ratio line for an ESP in accordance with the present disclosure.

Pressure measurements from block 202, torque from block 208, and speed from block 206 are provided as inputs to the computation of FIG. 5. The pressure-to-torque ratio as computed in block 208 is applied to an efficiency curve k(y) for the ESP 102. The pressure-to-torque ratio defines the slope of a line that intersects the efficiency curve to identify the value of the flow-to-speed ratio. FIG. 6 shows an example graph of pump efficiency versus flow-to-speed ratio for an example of the ESP 102. FIG. 7 shows the intersection of a pump efficiency curve of with a pressure-to-torque ratio line for an example of the ESP 102. With the following substitutions:

$$y = \frac{p_d - p_i}{\tau}$$

$$x = \frac{Q}{\omega}$$

$$\eta_{Pump} = \frac{(P_d - P_i)Q}{\tau\omega} = f(x) = yx$$

the point of operation of the ESP 102 is determined by the intersection of the flow-to-speed ratio and the efficiency curve. In this representation, the factory is represented by the pressure-to-torque ratio. The abscissa coordinate of the intersection represents the flow-to-speed ratio. The flow rate may be determined by multiplying the flow-to-speed ratio by the speed determined in block 206, or, in case of a normalized representation to nominal speed, by the speed ratio of the nominal speed.

The intersection of the pressure-to-torque line with the polynomial representing the efficiency curve may be identified in various ways. For example, iteration may be applied to identify the point of intersection. However, some implementations of the processing circuitry 108 may apply more direct methods.

$$y = \frac{\eta_{Pump}}{x} = \frac{f(x)}{x} = g(x)$$
$$x = g^{-1}(y)$$

The inverse dependency $x=k(y)=g^{-1}(y)$ of variable x can be derived directly from a polynomial curve fit. If more calibration points are used than the chosen order of the polynomial there is a small side effect. The points in the efficiency curve at low speed get more weight in the cost function. This can be overcome by using a curve fit on the efficiency curve first and then determining the inverse dependency $g^{-1}(y)$ through interpolation from a table. Another solution is to convert the table back through polynomial curve fit.

Example

| y(t1) | x(t1) |
| y(t2) | x(t2) |
| y(t3) | x(t3) |

Polynomial: $x=k(y)=a_0+a_1y+a_2y^2$

Referring again to FIG. 2, in block 214, the processing circuitry 108 computes head based on the flow-to-speed ratio computed in block 210 and the speed computed in block 206. In FIG. 5, computation of head begins with multiplying the flow-to-speed ratio and a head calibration curve (h(x)) to produce a normalized version of the head (Hn). The calibration head curve polynomial may be computed as:

$$H_n(x_c) = h(x_c) = \frac{(P_d - P_i)\omega_c^2}{\rho g \omega_n^2}$$

Thus, with known density ρ and gravity constant g, head h(xc) can be calculated for each calibration point $x_c$. Since head is proportional to the square of the speed, the calibration points are normalized to the square of the speed. The polynomial h(x) can be derived by fitting the coordinated $H_n(x_c)$, $x_c$.

Example

| x(t1) | $H_n$(t1) |
| x(t2) | $H_n$(t2) |
| x(t3) | $H_n$(t3) |

Polynomial: $h(y)=b_0+b_1x+b_2x^2$

The affinity law is applied to the normalized head to determine a final value of head based on the speed determined in block 206 relative the speed of the ESP 102 in the manufacturing reference curve. Head is expressed as:

$$H(t) = \frac{Hn(x(t))\omega(t)^2}{\omega n^2}$$

Referring again to FIG. 2, in block 216, the processing circuitry 108 computes density based on the head computed in block 214. Density is expressed as:

$$\rho = \frac{p}{gH(t)}$$

As shown in FIG. 5, the final value of head, pressure determined in block 202, and the gravity constant are applied to compute the density of the fluid in the ESP 102.

The processing circuitry 108 may change the speed of the ESP 102 responsive to the value of the flow and/or the value of density.

Table 1 below shows an example of calibration measurements produced at manufacturing test and used to generate an efficiency curve.

TABLE 1

| Δp | Q | ω | τ |
|---|---|---|---|
| 7519767 | 0 | 371.1928 | 333.3956 |
| 6917165 | 0.006158 | 370.3173 | 385.2747 |
| 6799265 | 0.012258 | 368.7109 | 472.4253 |
| 7287621 | 0.020024 | 365.7536 | 616.6545 |
| 6934126 | 0.024411 | 364.7337 | 660.7945 |
| 6490145 | 0.027463 | 364.5148 | 669.8337 |
| 5280708 | 0.032025 | 364.5378 | 668.4169 |
| 3446013 | 0.037021 | 365.4405 | 639.5298 |
| 2171393 | 0.039531 | 366.4406 | 592.6063 |

Table 2 below shows an example of application of calibration data.

| t | Input Δp | Input Q | Input ω | Input τ | Head at $\omega_n$ $H_n = \omega^2/\omega_n^2$ Δp/ρ/g | Efficiency η(x) = Q Δp/ω/τ | Curve fit input g(x) = η(x)/x | Curve fit input y = Δp/τ | Curve fit input x = Q/ω |
|---|---|---|---|---|---|---|---|---|---|
| t1 | Δp(t1) | Q(t1) | ω(t1) | τ(t1) | $H_n$(t1) | η (t1) | g(x(t1)) | y(t1) | x(t1) |
| t2 | Δp(t2) | Q(t2) | ω(t2) | τ(t2) | $H_n$(t2) | η (t2) | g(x(t2)) | y(t2) | x(t2) |
| ... | | | | | | | | | |

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electrical submersible pump system for an electrical submersible pump (ESP) comprising an electric motor, the electrical submersible pump system comprising:
    drive circuitry configured to be electrically coupled to the ESP and configured to provide an electrical signal to power the ESP;
    a current sensor configured to sense current of the electrical signal;
    a voltage sensor configured to sense a voltage of the electrical signal; and
    a processing circuit configured to:
        calculate speed of a shaft of the electric motor based on a frequency induced by rotation of the electric motor detected in the current;
        calculate a density of a fluid in the ESP based on the speed;
        determine a torque in the ESP based on the current of the electrical signal, a measured voltage of the electrical signal, a resistance of a conductor that electrically couples the ESP to the drive circuitry, and a resistance of a stator of the ESP; and
        adjust the speed of the electric motor based on at least one of the speed of the shaft, the density of the fluid, the torque in the ESP, or a flow rate of the fluid in the ESP.

2. The electrical submersible pump system of claim 1, wherein the processing circuit is configured to:
    determine the flow rate of the fluid in the ESP based on the speed.

3. The electrical submersible pump system of claim 1, wherein the processing circuit is configured to:
    determine a value of head based on the speed, wherein the density is further based on the value of head.

4. The electrical submersible pump system of claim 1, wherein the processing circuit is configured to:
    adjust the torque in the ESP based on a viscous drag value of the ESP.

5. The electrical submersible pump system of claim 1, wherein the processing circuit is configured to:
    determine the resistance of the conductor as a function of a temperature of the conductor;
    determine the resistance of the stator as a function of a temperature of the electric motor; and
    adjust the speed of the electric motor to account for the resistance of the conductor and the resistance of the stator.

6. The electrical submersible pump system of claim 1, wherein the processing circuit is configured to:
    adjust the speed of the electric motor to account for at least one of the resistance of the conductor or the resistance of the stator.

7. The electrical submersible pump system of claim 1, further comprising:
    an intake pressure sensor coupled to the ESP and configured to measure a pressure of the fluid at an intake of the ESP; and
    a discharge pressure sensor coupled to the ESP and configured to measure a pressure of the fluid at an outlet of the ESP;
    wherein the processing circuit is configured to:
        determine a pressure-to-torque ratio in the ESP based on the pressure of the fluid at the intake of the ESP, and the pressure of the fluid at the outlet of the ESP;
        determine the flow rate of the fluid in the ESP based on at least the pressure-to-torque ratio, wherein the density of the fluid in the ESP is further based on the flow rate of the fluid in the ESP; and
        adjust the speed of the electric motor based on the pressure-to-torque ratio in the ESP.

8. The electrical submersible pump system of claim 7, wherein the processing circuit is configured to calculate a flow-to-speed ratio based on an efficiency curve for the ESP and the pressure-to-torque ratio, wherein the efficiency curve is recalibrated based on receiving new test data corresponding to subsequent steady state controlled conditions.

9. The electrical submersible pump system of claim 8, wherein the processing circuit is configured to calculate the flow rate of the fluid in the ESP based on the flow-to-speed ratio.

10. A method for controlling an electrical submersible pump (ESP), comprising:
    providing an electrical drive signal to power the ESP;
    calculating a speed of a shaft of an electric motor of the ESP based on a frequency induced by rotation of the electric motor detected in a current of the electrical drive signal;
    calculating a density of a fluid in the ESP based on the speed;
    determining a torque in the ESP based on the current of the electrical drive signal, a voltage of the electrical drive signal, a resistance of a conductor that electrically couples the ESP to drive circuitry, and a resistance of a stator of the ESP; and
    adjusting the speed of the electric motor based on at least one of the speed of the shaft, the density of the fluid, the torque in the ESP, or a flow rate of the fluid in the ESP.

11. The method of claim 10, further comprising determining the flow rate of the fluid in the ESP based on the speed.

12. The method of claim 10, further comprising determining a value of head based on the speed, wherein the density is further based on the value of head.

13. The method of claim 10, further comprising:
    determining a resistance of the conductor as a function of a temperature of the conductor;
    determining a resistance of the stator as a function of a temperature of the electric motor; and
    adjust the speed of the electric motor to account for the resistance of the conductor and the resistance of the stator.

14. The method of claim 10, further comprising:
    receiving a first pressure of the fluid at an intake of the ESP;
    receiving a second pressure of the fluid at an outlet of the ESP;
    determining a pressure-to-torque ratio in the ESP based on the first pressure, the second pressure and the torque in the ESP;
    determining the flow rate of the fluid in the ESP based on at least the pressure-to-torque ratio;
    determining density of the fluid in the ESP based on at least one of the speed of the shaft or the flow rate of the fluid in the ESP; and
    adjusting the speed of the electric motor based on the pressure-to-torque ratio in the ESP.

15. The method of claim 14, further comprising calculating a flow-to-speed ratio based on an efficiency curve for the ESP and the pressure-to-torque ratio.

16. The method of claim 15, further comprising calculating the flow rate of the fluid in the ESP based on the flow-to-speed ratio.

17. A non-transitory computer-readable medium encoded with instructions that, when executed by a processor, cause operations comprising:

receiving a measurement of a current of an electrical drive signal powering an electrical submersible pump (ESP);

receiving a measurement of a voltage of the electrical drive signal;

calculating a speed of a shaft of an electric motor of the ESP based on a frequency detected in the current, wherein the frequency is induced in the current by rotation of the electric motor;

calculating:

a density of a fluid in the ESP based on the speed of the shaft,         a flow rate of the fluid in the ESP based on the speed of the shaft, and         a torque in the ESP based on the current, the voltage, a resistance of a conductor of the ESP, and a resistance of a stator of the ESP; and     adjusting the speed of the ESP based on at least one of the speed of the shaft, the density of the fluid, the torque in the ESP, or the flow rate of the fluid in the ESP.

18. The non-transitory computer-readable medium of claim 17, wherein the instructions, when executed by the processor cause operations comprising:

receiving a measurement of a pressure of the fluid at an intake of the ESP;

receiving a measurement of a pressure of the fluid at an outlet of the ESP; and     calculating a ratio of the pressure across the ESP to the torque.

19. The non-transitory computer-readable medium of claim 18, wherein the instructions, when executed by the processor, cause operations comprising calculating a flow-to-speed ratio based on an efficiency curve for the ESP and the ratio of the pressure across the ESP to the torque.

20. The non-transitory computer-readable medium of claim 19, wherein the instructions, when executed by the processor, cause operations comprising calculating the flow rate based on the flow-to-speed ratio.

* * * * *